US009926945B2

(12) United States Patent
McDonnell

(10) Patent No.: US 9,926,945 B2
(45) Date of Patent: Mar. 27, 2018

(54) SNAP-TOGETHER STAND FOR A FAN

(71) Applicant: Joseph A. McDonnell, Miramar, FL (US)

(72) Inventor: Joseph A. McDonnell, Miramar, FL (US)

(*) Notice: Subject to any disclaimer, the term of this patent is extended or adjusted under 35 U.S.C. 154(b) by 0 days.

(21) Appl. No.: 15/177,952

(22) Filed: Jun. 9, 2016

(65) Prior Publication Data

US 2016/0363256 A1  Dec. 15, 2016

Related U.S. Application Data

(60) Provisional application No. 62/173,622, filed on Jun. 10, 2015.

(51) Int. Cl.
| F04D 29/60 | (2006.01) |
| F16M 11/24 | (2006.01) |
| F16M 11/22 | (2006.01) |
| A47F 5/10 | (2006.01) |
| F04D 29/64 | (2006.01) |
| F04D 25/08 | (2006.01) |

(52) U.S. Cl.
CPC .......... F04D 29/601 (2013.01); A47F 5/106 (2013.01); F04D 25/08 (2013.01); F04D 29/60 (2013.01); F04D 29/646 (2013.01); F16M 11/22 (2013.01); F16M 11/24 (2013.01)

(58) Field of Classification Search
CPC ...... F04D 29/646; F04D 29/60; F04D 29/601; F16M 11/22; A47F 5/106
USPC ....... 248/676, 158, 159, 165, 188, 529, 150, 248/146, 127, 151, 152, 157; 211/206, 211/204, 195, 105.1, 85.3, 182
See application file for complete search history.

(56) References Cited

U.S. PATENT DOCUMENTS

| 1,587,090 | A | * | 6/1926 | Tweed | B65G 7/08 |
| | | | | | 211/182 |
| 2,110,158 | A | * | 3/1938 | Keeler | A47G 25/0678 |
| | | | | | 211/182 |
| 2,521,920 | A | * | 9/1950 | Koch | F04D 29/646 |
| | | | | | 248/161 |
| 2,598,529 | A | * | 5/1952 | Fritz | G03B 42/025 |
| | | | | | 248/124.2 |
| D169,007 | S | | 3/1953 | Lindberg et al. | |
| D172,514 | S | | 6/1954 | Podall | |
| 2,767,003 | A | * | 10/1956 | Gilmont | B01L 9/50 |
| | | | | | 126/30 |
| 2,830,779 | A | | 4/1958 | Wentling | |

(Continued)

FOREIGN PATENT DOCUMENTS

| WO | WO 0218796 A1 | * | 3/2002 | ......... F04D 25/166 |
| WO | WO 2015118803 A1 | * | 8/2015 | ......... F04D 19/002 |

OTHER PUBLICATIONS

U.S. Appl. No. 29/529,748, filed Jun. 10, 2015.

*Primary Examiner* — Eret C McNichols
(74) *Attorney, Agent, or Firm* — Harness, Dickey & Pierce, P.L.C.

(57) ABSTRACT

The stand may be manually assembled without requiring tools. Two-points of contact are made between a horizontal support bar and respective upper and lower vertical posts in order to help resist vibration of the stand and the fan. Side clips are used to hold the fan. The side clips are slideable along a longitudinal length of the upper vertical posts. The side clips selectively grip the upper vertical posts at positions along a longitudinal length of the posts.

18 Claims, 23 Drawing Sheets

(56) References Cited

U.S. PATENT DOCUMENTS

| | | | |
|---|---|---|---|
| D184,316 S | 1/1959 | Krauss | |
| 2,868,558 A * | 1/1959 | Krauss | F04D 29/646 248/129 |
| 2,958,110 A * | 11/1960 | McBrien | B01L 9/50 248/124.2 |
| 3,117,760 A * | 1/1964 | Dresbach | A63B 1/00 248/157 |
| D205,252 S | 7/1966 | Schreckengost | |
| 3,404,884 A * | 10/1968 | Sorenson | A63B 4/00 248/129 |
| 3,405,894 A * | 10/1968 | Jordan | E02F 3/64 248/125.3 |
| 4,790,500 A * | 12/1988 | Mori | A61N 5/06 248/157 |
| 4,934,015 A * | 6/1990 | Mink | A47L 4/04 15/268 |
| 5,370,500 A * | 12/1994 | Thompson | F04D 29/601 248/125.3 |
| 5,501,544 A * | 3/1996 | Cairns | B65G 21/2072 248/231.61 |
| 5,520,293 A * | 5/1996 | Hartley | A47B 81/068 211/182 |
| 5,769,371 A * | 6/1998 | Bandur | A47C 7/008 248/157 |
| D416,996 S | 11/1999 | Mack | |
| 5,987,789 A * | 11/1999 | Lubina | A47B 97/04 38/102.1 |
| 6,116,437 A * | 9/2000 | Rowe | F28D 1/04 211/119.008 |
| 6,223,358 B1 * | 5/2001 | DePietro | A63B 61/003 248/157 |
| 6,226,931 B1 * | 5/2001 | Haversat | A47F 5/106 160/135 |
| 6,390,311 B1 * | 5/2002 | Belokin | A61M 5/1415 211/189 |
| 6,390,424 B1 * | 5/2002 | Kidushim | A45D 20/12 248/122.1 |
| 6,517,043 B1 * | 2/2003 | Cahill | F04D 29/601 248/188.7 |
| 6,550,725 B1 * | 4/2003 | Watson | F04D 29/601 248/127 |
| 6,761,274 B1 * | 7/2004 | Chen | A47B 45/00 211/204 |
| 6,796,446 B2 * | 9/2004 | Segall | A47G 25/0664 211/204 |
| 6,817,478 B2 * | 11/2004 | Venegas, Jr. | A47F 5/137 211/182 |
| 6,902,071 B2 * | 6/2005 | Vitale | G11B 33/0461 211/35 |
| 7,077,277 B2 * | 7/2006 | Wang | A47B 91/02 182/186.7 |
| 7,249,680 B2 * | 7/2007 | Wang | A47B 57/04 211/150 |
| 7,516,590 B2 * | 4/2009 | Brinkmann | E04G 5/02 182/152 |
| 7,850,021 B2 * | 12/2010 | Yang | A47B 47/0008 211/182 |
| 7,938,372 B2 * | 5/2011 | MacLeod | A47B 21/00 108/10 |
| 8,042,785 B2 * | 10/2011 | Durello | A47B 5/105 211/123 |
| 8,141,723 B2 * | 3/2012 | Whalen | A47B 47/045 211/135 |
| 9,605,854 B2 * | 3/2017 | Zimmerman | F24F 5/0035 |
| 9,648,949 B1 * | 5/2017 | Penaflor | A47B 81/00 |
| 2001/0019095 A1 * | 9/2001 | Valiulis | A47B 91/00 248/188.7 |
| 2004/0104319 A1 * | 6/2004 | Dean | F16B 7/025 248/146 |
| 2004/0112854 A1 * | 6/2004 | Lai | A47G 25/0664 211/206 |
| 2004/0222179 A1 * | 11/2004 | Garcia | A47B 87/0223 211/206 |
| 2007/0163974 A1 * | 7/2007 | Lai | A47G 25/0664 211/85.3 |
| 2008/0029473 A1 * | 2/2008 | Hu | A47G 25/0664 211/206 |
| 2008/0149007 A1 * | 6/2008 | MacLean | A47B 13/021 108/155 |
| 2008/0272252 A1 * | 11/2008 | Conde | A47B 96/1425 248/146 |
| 2010/0237027 A1 * | 9/2010 | Shaha | B62H 3/12 211/17 |
| 2010/0300998 A1 * | 12/2010 | Plante | D06F 53/04 211/85.3 |
| 2012/0138557 A1 * | 6/2012 | Lee | D06F 57/06 211/85.3 |
| 2014/0262659 A1 * | 9/2014 | Hirsch | A47B 61/06 190/13 R |
| 2015/0008201 A1 * | 1/2015 | Qiang | A47F 7/24 211/85.3 |
| 2015/0014263 A1 * | 1/2015 | Lo | A47F 5/01 211/182 |
| 2015/0076311 A1 * | 3/2015 | Hakansson | F16M 11/18 248/422 |
| 2016/0327201 A1 * | 11/2016 | He | F16M 11/38 |

* cited by examiner

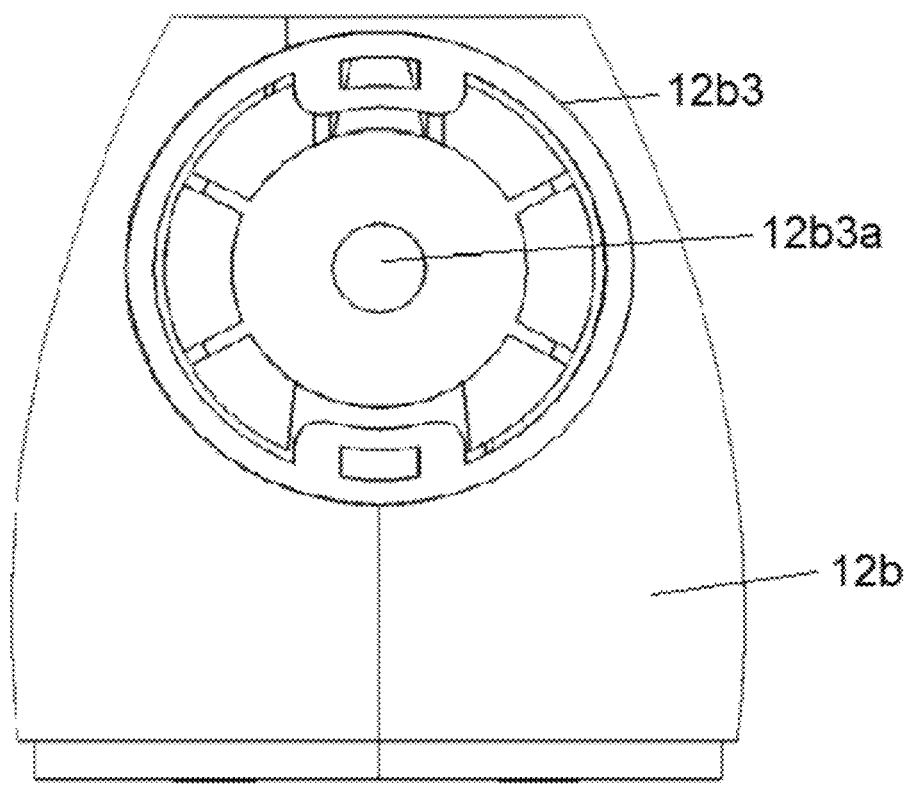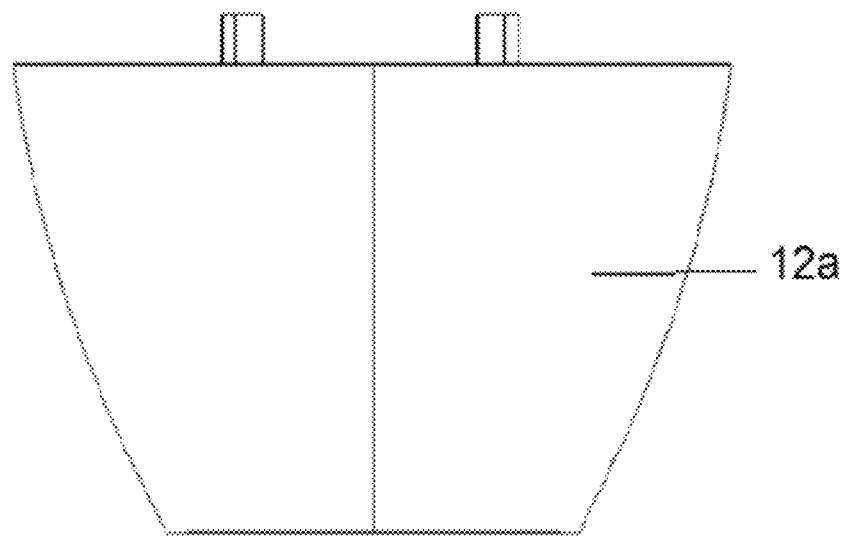
FIG. 16

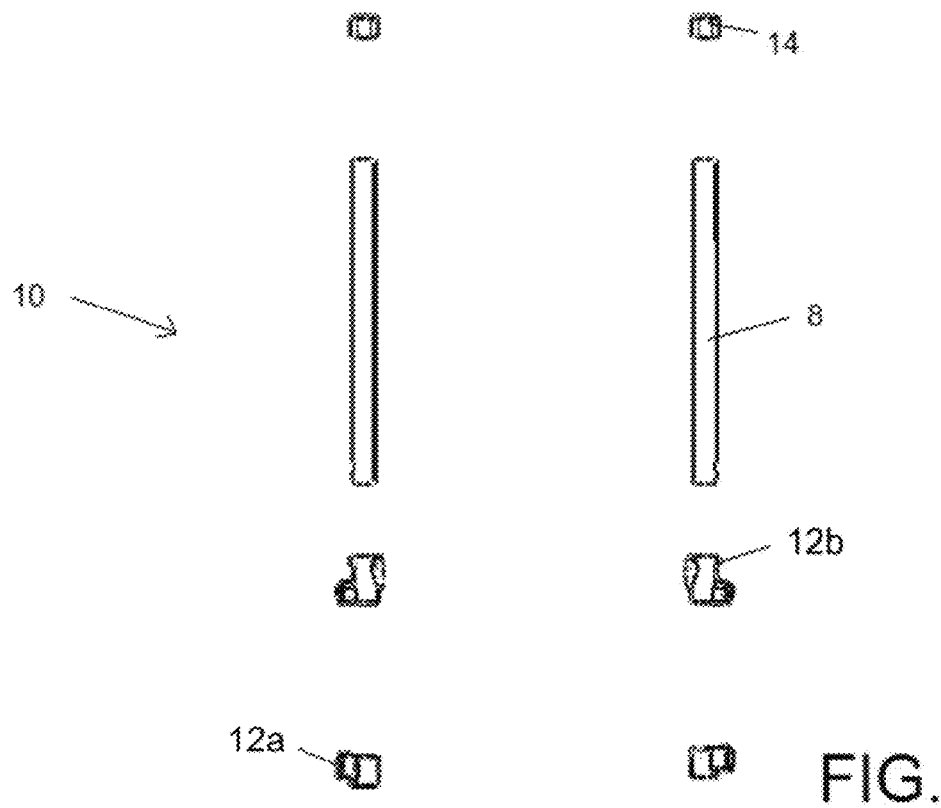
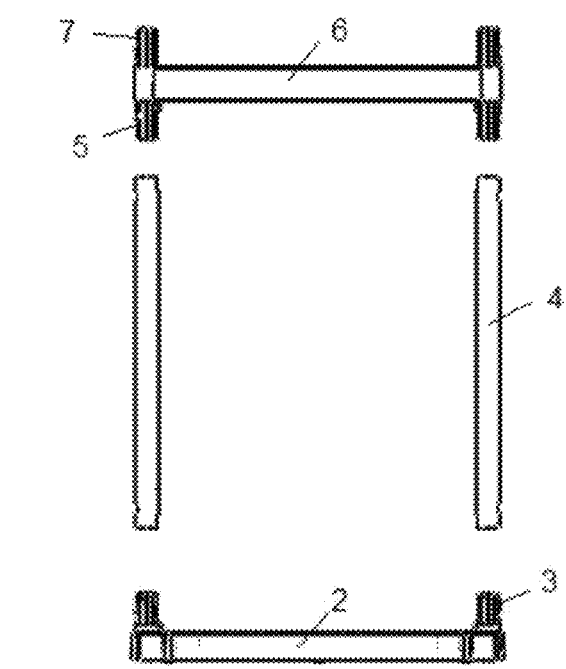
FIG. 22

US 9,926,945 B2

SNAP-TOGETHER STAND FOR A FAN

PRIORITY STATEMENT

This application is a non-provisional application that claims priority to U.S. provisional application No. 62/173,622, filed on Jun. 10, 2015, the entire contents of which is incorporated by reference in its entirety.

BACKGROUND OF THE INVENTION

Field of the Invention

Example embodiments relate generally to a stand capable of being assembled without tools. More particularly, example embodiments relate to a stand that horizontally and vertically stabilizes a motorized device, such as a fan, that may experience vibration while in use.

Related Art

Conventionally, consumer products such as a motorized fan that may be purchased in a box often require some amount of assembly or setup in order to operate the product. Such products often times requires the use of a screwdriver, a hex key (Allen wrench), a conventional wrench, a ratchet set, or other tools that may or may not be provided with the product in order to fully assembly and use the product. Invariably, the end consumer may not have the tools necessary to assembly the product. Or, in order to assist the consumer, tools may be shipped with the product, thereby increasing the overall manufacturing cost and sale cost of the product.

SUMMARY OF INVENTION

At least one example embodiments relates to a kit for a stand holding an electronic device.

In one embodiment, the kit includes at least a first and a second lower vertical post; a horizontal support bar with at least a first and a second lower vertical stub and at least a first and second upper vertical stub, a first end of each of the lower vertical posts being connectable to the respective first and second lower vertical stubs via at least two points of contact; at least a first and a second upper vertical post, a first end of each of the upper vertical posts being connectable to the respective first and second upper vertical stubs via at least two points of contact; and a first and a second side clip, each of the side clips being connected to the electronic device, the side clips being configured to slide onto the respective first and second upper vertical posts, the side clips being configured to selectively grip the respective first and second upper vertical posts at positions along a longitudinal length of the respective first and second upper vertical posts, wherein the kit is configured to be assembled into the stand without requiring tools.

In one embodiment, the kit further includes a base with at least a first and a second bottom vertical stub, a second end of each of the lower vertical posts being connectable to the respective first and second bottom vertical stubs of the base via at least two points of contact.

In one embodiment, the first end of each of the lower vertical posts define a lower aperture and a lower notch that are respectively mateable with a lower depressible stop and a lower physical stop on each of the lower vertical stubs of the horizontal support bar to provide the two points of contact for the connection between the lower vertical stubs of the horizontal support bar and the lower vertical posts.

In one embodiment, the second end of each of the lower vertical posts defines a bottom aperture and a bottom notch that are respectively mateable with a bottom depressible stop and a bottom physical stop on each of the bottom vertical stubs of the base to provide the two points of contact for the connection between the lower vertical posts and the bottom vertical stubs of the base.

In one embodiment, the first end of each of the upper vertical posts defines an upper aperture and an upper notch that are respectively mateable with an upper depressible stop and an upper physical stop on each of the upper vertical stubs of the horizontal support bar to provide the two points of contact for the connection between the upper vertical posts and the upper vertical stubs of the horizontal support bar.

In one embodiment, the lower and bottom apertures are on a same first side of the lower vertical posts, and the lower and bottom notches are on a same second side of the lower vertical posts, wherein the apertures and notches of the lower vertical posts are respectively offset from each other by about 180 degrees along a circumference of each of the respective lower vertical posts.

In one embodiment, the bottom vertical stubs of the base are on opposing sides of the base, and the bottom depressible stops of the bottom vertical stubs are facing away from each other on opposing sides of the bottom vertical stubs, wherein the bottom physical stops of the bottom vertical stubs face each other on the bottom vertical stubs.

In one embodiment, the upper and lower depressible stops and the upper physical stops of the respective upper and lower vertical stubs of the horizontal support bar are on a same first side of each of the respective upper and lower vertical stubs, wherein the lower physical stops are on opposing sides of the respective lower vertical stubs relative to a location of the lower depressible stops, the lower physical stops facing each other on the horizontal support bar.

In one embodiment, the lower physical stops of the lower vertical stubs of the horizontal support bar are about 180 degrees offset from the lower depressible stops along a circumference of the lower vertical stubs.

In one embodiment, the electronic device is a fan, wherein each of the side clips are connected to sides of the fan with a socket that allows a front of the fan to pivot in upward and downward angles.

In one embodiment, each of the side clips include a hinged tab facing away from the fan, the hinged tabs of each of the side clips communicating with a gripper positioned along an inner surface of each of the respective side clips, each of the grippers being configured to selectively grip the respective first and second upper vertical posts via selective movement of the hinged tabs.

In one embodiment, the lower vertical posts are longer than the upper vertical posts.

At least one example embodiments relates to a stand that is capable of being assembled by a method that does not require tools.

In one embodiment, the method includes depressing the bottom depressible stops of the bottom vertical stubs of the base and sliding the second ends of the first and second lower vertical posts onto the respective bottom vertical stubs so that the bottom physical stops mate with the bottom notches and the bottom depressible stops slide into the bottom apertures; depressing the lower depressible stops of the lower vertical stubs of the horizontal support bar and sliding the first ends of the first and second lower vertical posts onto the respective lower vertical stubs so that the lower physical stops mate with the upper notches and the lower depressible stops slide into the upper apertures; and depressing the upper depressible stops of the upper vertical stubs of the horizontal support bar and sliding the ends of the first and second upper vertical posts onto the respective upper vertical posts so that the upper physical stops mate with the lower notches and the upper depressible stops slide into the lower apertures.

In one embodiment, the method further includes sliding the first and second side clips onto the respective first and second upper vertical posts; locking the electronic device into a desired vertical elevation along the first and second upper vertical posts using the side clips; and pressing stoppers on top of upper ends of the upper vertical posts.

At least one example embodiment relates to a stand.

In one embodiment, the stand includes a horizontal support bar; at least a first and second lower vertical post, a first end of each of the lower vertical posts being connected to lower vertical stubs on a lower portion of the horizontal support bar via at least two points of contact; at least a first and second upper vertical post, a first end of each of the upper vertical posts being connected to upper vertical stubs on an upper portion of the horizontal support bar via at least two points of contact; a first and a second side clip, each of the side clips being connected to an electronic device to hold the electronic device between the upper vertical posts, each of the side clips being configured to selectively grip one of the first and second upper vertical posts at positions along a longitudinal length of the respective upper vertical posts, wherein the stand is configured to be assembled without requiring tools.

In one embodiment, the stand further includes a base, wherein a second end of each of the lower vertical posts being connected to bottom vertical stubs on the base via at least two points of contact.

In one embodiment, each of the vertical stubs includes at least two of a physical stop and a depressible stop, and each of the first and second ends of the lower vertical posts, and each of the first ends of the upper vertical posts, defines at least two of a notch and an aperture that are mateable with the respective physical stops and depressible stops of the vertical stubs to provide the two points of contact.

In one embodiment, each of the vertical stubs includes a physical stop and a depressible stop, the upper vertical stubs of the horizontal support bar having an upper depressible stop and an upper physical stop on a same side of the upper vertical stubs.

In one embodiment, the lower vertical stubs of the horizontal support bar, and the bottom vertical stubs of the base, each have a lower depressible stop and a lower physical stop on opposing sides of the respective lower and bottom stubs, the respective lower and bottom physical stops of the lower and bottom vertical stubs facing inward toward each other.

In one embodiment, the electronic device is a fan, each of the side clips being connected to sides of the fan via a socket that allows a front of the fan to pivot in upward and downward angles, the side clips including a hinged tab facing away from the fan and being in communication with a gripper positioned along an inner surface of each of the side clips, the gripper being configured to selectively grip the respective first and second upper vertical posts.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 16 illustrates an illustration of a side view of the upper portion and lower portion of FIGS. 13 and 14, in accordance with an example embodiment;

FIG. 22 is an illustration of an exploded view of an unassembled stand, in accordance with an example embodiment.

DETAILED DESCRIPTION

Figure 1:
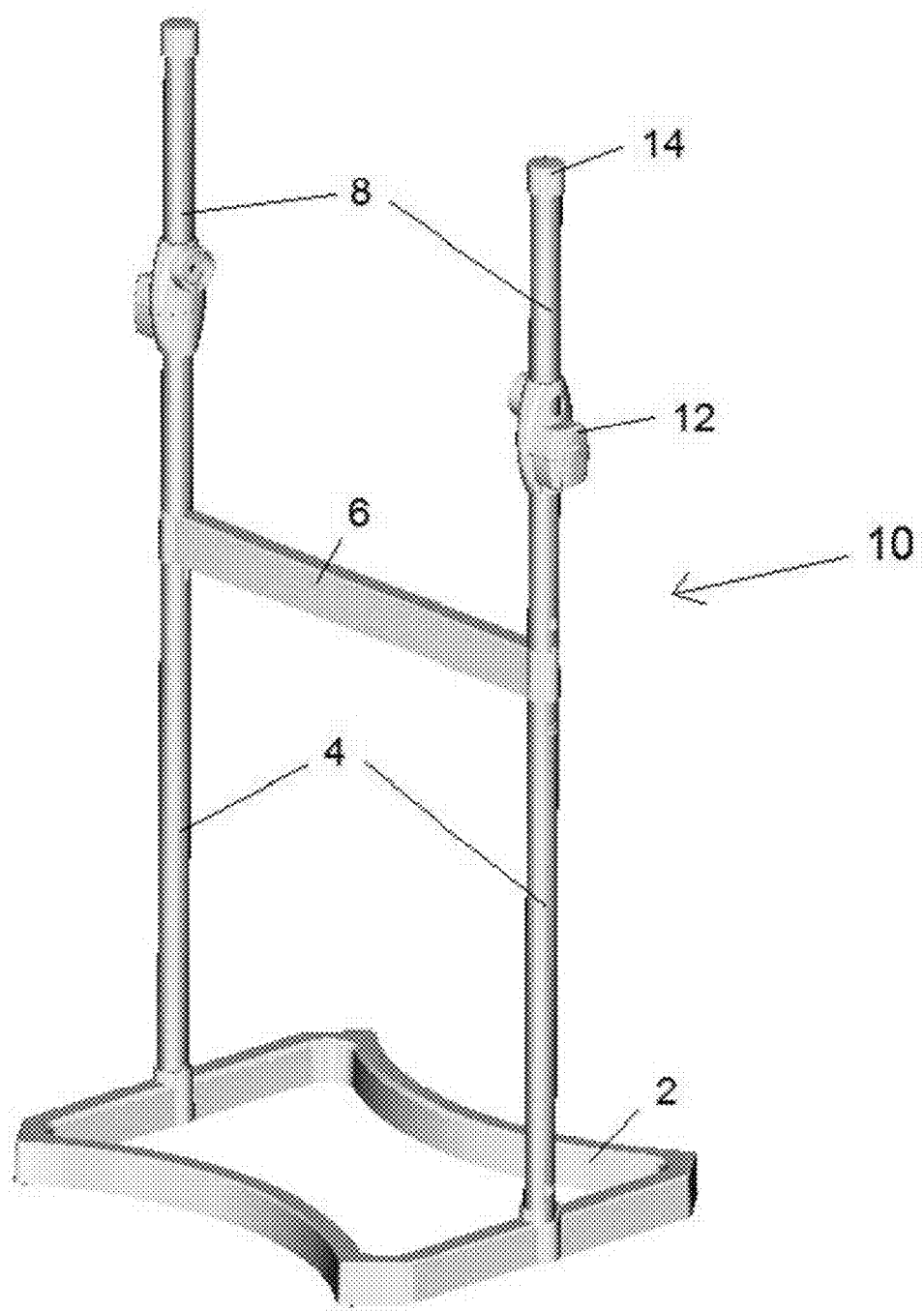
FIG. 1 is an illustration of a perspective view of an assembled stand, in accordance with an example embodiment.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is an illustration of a perspective view of an assembled stand 10, in accordance with an example embodiment. The stand 10 may include a supportive base 2 that may be wide enough to potentially withstand vibration while the stand 10 is in use. The stand 10 may also include vertical lower posts 4 connected to the base 2. While two vertical lower posts 4 are shown in this example embodiment, it should be understood that one vertical lower post 4 may be used rather than two posts 4 (not shown). Alternatively, more than two posts 4 may also be used (not shown).

A support bar 6 may be used to hold a top portion of the vertical lower posts 4 together, in order to stabilize the stand 10, especially in the event that the stand 10 may experience vibration while in use. It should be understood that a support bar 6 would not be utilized in the event that only a single lower post 4 is used. Furthermore, in the event that more than two lower posts 4 are used for the stand 10, a single support bar 6 may be used to connect a top portion of each of the lower posts together (not shown). Alternatively, in the event that more than two lower posts 4 are used for the stand 10, more than one support bar 6 may be used to connect the lower posts 4 to each other. For instance, in an alternative embodiment, a single support bar 6 may be used to connect two (or more) lower posts 4 to each other, such that multiple support bars 6 may then be used in order to ultimately connect each lower post 4 to another adjacent lower post 4. For example, using a stand configuration with three lower posts 4, two or three support bars 6 may be used to connect each lower post 4 to at least one other adjacent lower post 4 (not shown).

Vertical upper posts 8 may be connected to the support bar 6. In the example embodiment of FIG. 1, two upper posts 8 are shown. However, in a stand configuration with only one vertical lower post 4, only a single upper post 8 may be used. Alternatively, in the event that more than two lower posts 4 for the stand 10, more than two upper posts 8 may also be used to add extra support and stability to the stand 10.

Side clips 12 (shown in more detail in FIGS. 13-18) may be included on the upper posts 8. The clips 12 may be used to hold a fan 20 (for instance) between the upper posts 8 (see this shown in FIG. 2). In an alternative embodiment, if only one upper post 8 is used for the stand 10, or if more than two upper posts 8 are used for the stand 10, a number of side clips 12 may equal a number of upper posts 8. In another alternative embodiment, the side clips may be attached to the lower posts 4, such that the stand 10 may not include upper posts 8.

Stoppers 14 may be fitted onto a top end of the upper posts 8.

Figure 2:
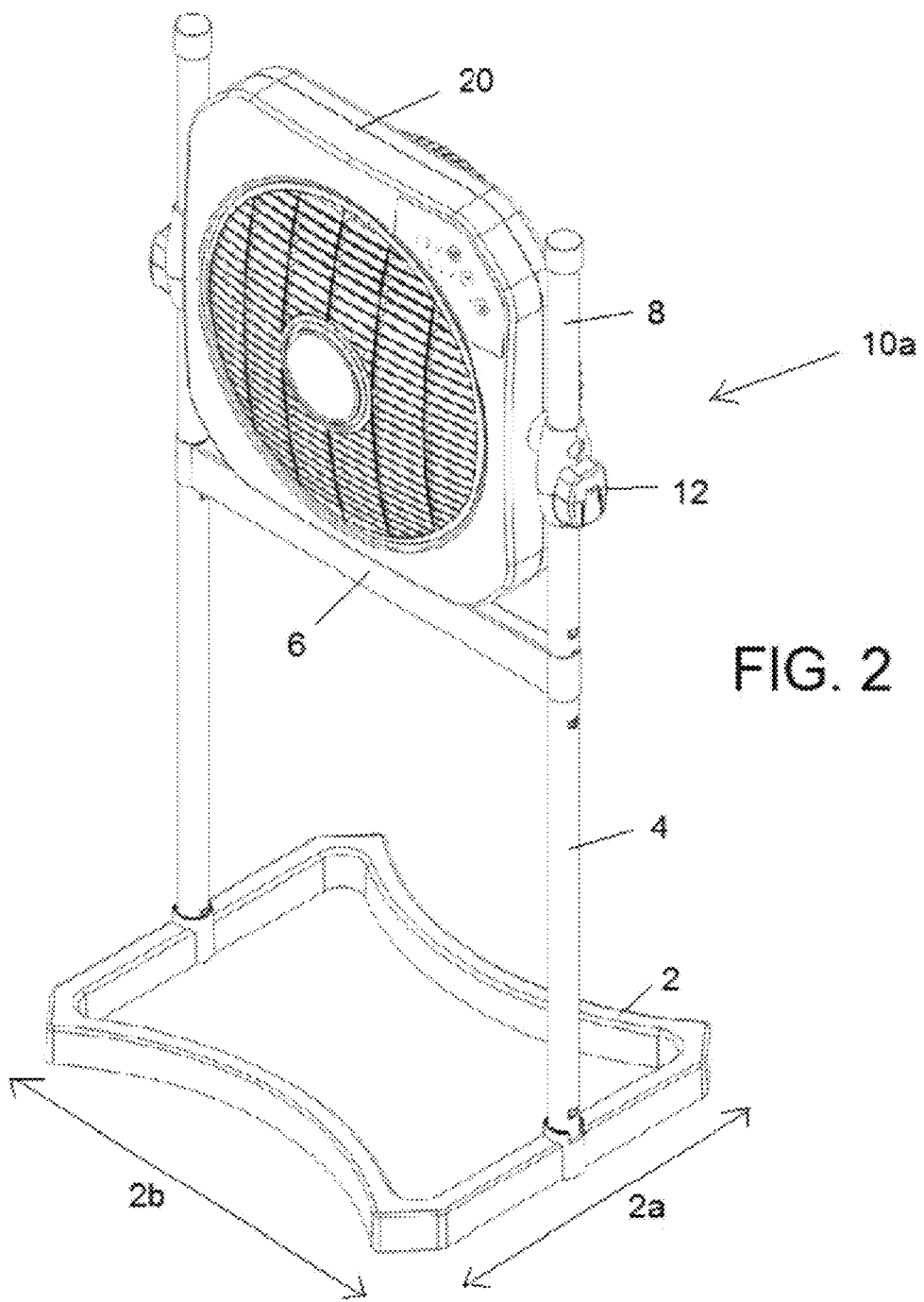
FIG. 2 is an illustration of a perspective view of an assembled stand, holding a fan, in accordance with an example embodiment.

FIG. 2 is an illustration of a perspective view of an assembled stand 10a, holding a fan 20, in accordance with an example embodiment. In particular, the clips may connect to side surfaces of the fan 20 in order to securely hold the fan between the upper posts 8 of the stand 10a (that includes the fan 20).

In order to provide the stand 10a with greater stability, a length of the upper posts 8 may be approximately equal to a length of the fan 20. This will allow the support bar 6 to be positioned relatively close to the fan 20 itself, in order for the overall stability of the stand 10a to be improved in holding the fan 20, especially in the event that the fan 20 may be expected to produce some amount of vibration while in use.

It is further noted that the lower posts 4 may be slightly longer than the upper posts 8. In such a configuration, an overall height of the stand 10a may be increased, while still affording a high degree of stability for the stand 10a, as the use of relatively shorter upper posts 8 may more firmly grip the sides of the fan 20 (i.e., the portion of the stand 10a located closest to a source of vibration), even if an overall height of the stand 10a is significantly taller than the fan 20 height.

In order to add further stability to the stand 10a as a whole, a width 2a portion of the base 2 (which runs about perpendicular to a length 2b of the base 2 spanning between the lower posts 4) may extend away from the lower posts 4. Furthermore, while the base 2 shown in FIGS. 1-4 has a somewhat rectangular footprint (with the width 2a being somewhat shorter than the length 2b), it should be understood that a somewhat square footprint may also be utilized. Alternatively, a circular or triangular-shaped footprint (or, another shape) may also be utilized for the base 2.

While FIG. 2 shows the stand 10a holding a fan 20, it should be understood that the stand 10a may alternatively hold another device besides a fan.

Figure 3:
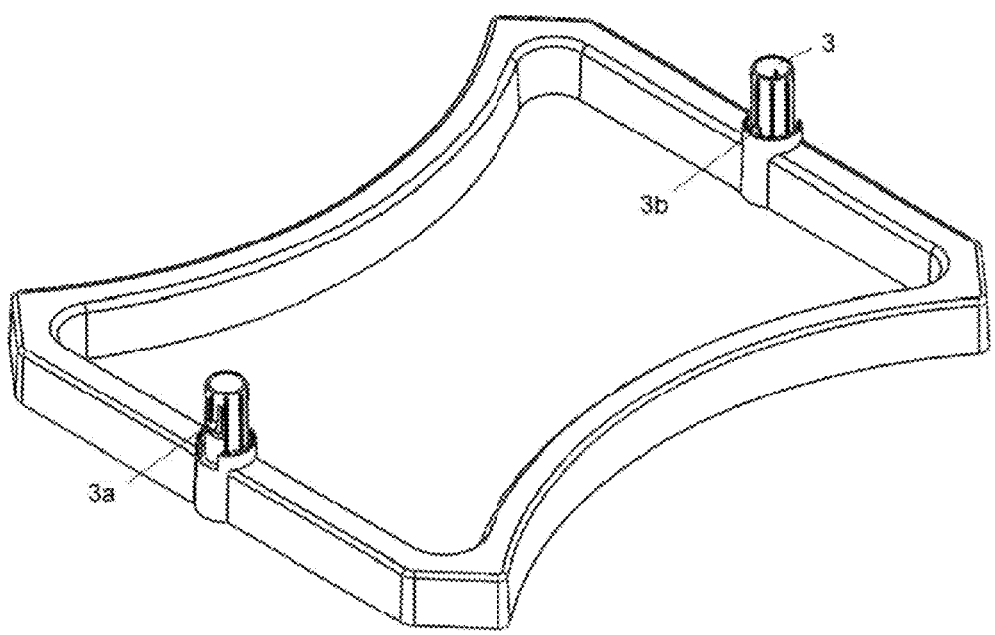
FIG. 3 is an illustration of a perspective view of a base of a stand, in accordance with an example embodiment.

FIG. 3 is an illustration of a perspective view of a base of a stand 2, in accordance with an example embodiment. The stand 2 may include one or more vertical stubs 3 connected to a top portion of the base 2. Each of the vertical stubs 3 may include one or more stops. For instance, each stub 3 may include a physical stop 3b, which may be positioned near a juncture between the stub 3 and a top portion of the base (shown in more detail in FIG. 4). Each stub 3 may also include a depressible stop 3a (also shown in FIG. 4). The depressible stop 3a may be configured to allow an end user to depress an outer surface of the stop 3a so that a portion of a lower post 4 may clear the stop 3a (shown in better detail in FIG. 7).

Figure 4:
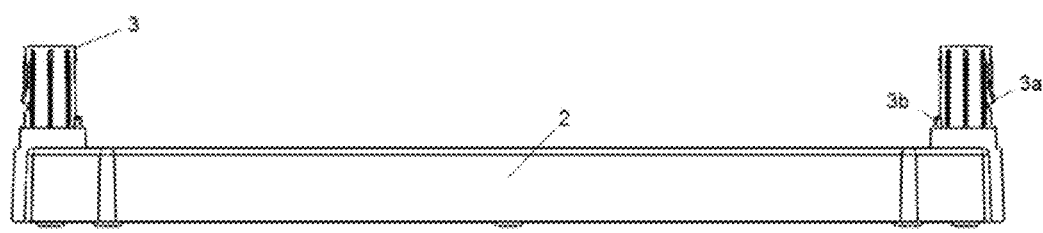
FIG. 4 is an illustration of a side view of the base of the stand shown in FIG. 3, in accordance with an example embodiment.

FIG. 4 is an illustration of a side view of the base 2 shown in FIG. 3, in accordance with an example embodiment. Notice that the depressible stop 3a and the physical stop 3b may be located on opposite sides of each stub 3 (such that the depressible stop 3a and the physical stop 3b are positioned about 180 degrees apart from each other on an outer surface of each stub 3). Alternatively, the depressible stop 3a and the physical stop 3b may be positioned on a same side of each stub 3. Or, the depressible stub 3a and the physical stop 3b may be spaced apart along an outer surface of the stub 3 using a different spacing than shown in FIG. 4 (such as 90 degrees apart, or 45 degrees, for example).

Figure 5:
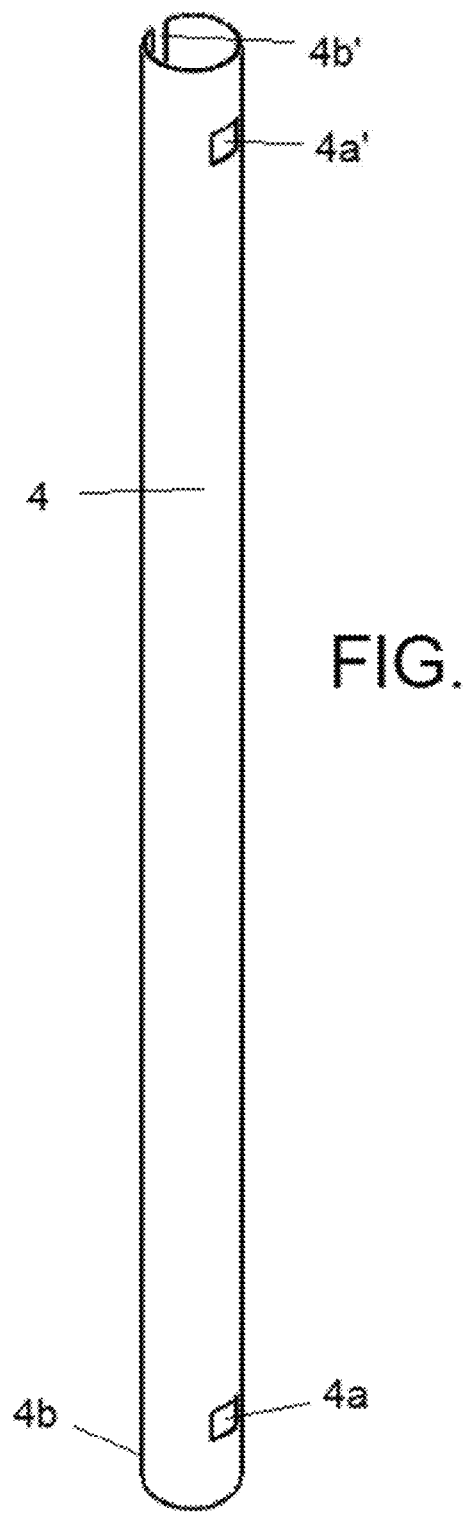
FIG. 5 is an illustration of a perspective view of a vertical lower post for a stand, in accordance with an example embodiment.

FIG. 5 is an illustration of a perspective view of a vertical lower post 4 for a stand 10, in accordance with an example embodiment. The lower post 4 may include one or more notches or apertures. For instance, the lower post 4 may include an upper notch 4b' and an upper aperture 4a' located near a top portion of the lower post 4. An identical lower notch 4b (shown in FIG. 6) and lower aperture 4a may also be located near a bottom portion of the lower post 4. The lower notch 4b may be mateable with the physical stop 3b of the base 2. The lower aperture 4a may be mateable with the depressible stop 3a and the base 2. Meanwhile, the upper notch 4b' and upper aperture 4a' may be respectively mateable with a lower physical stop 5b and lower depressible stop 5a of a support bar 6 (see FIGS. 9-11).

Figure 6:
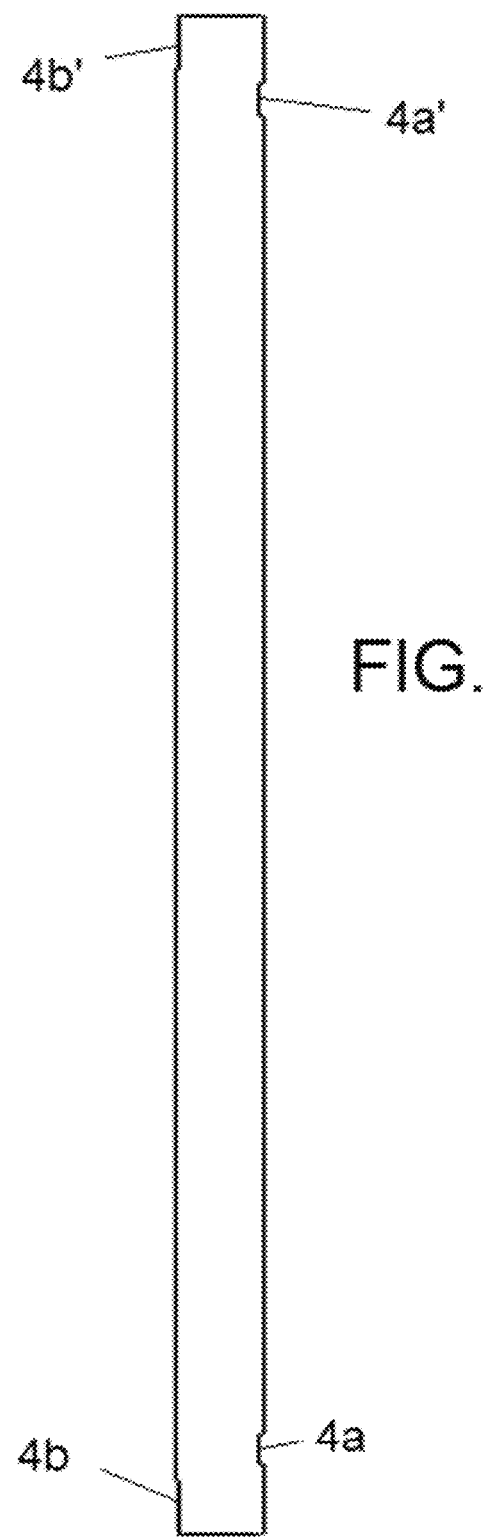
FIG. 6 is an illustration of a side view of the vertical lower post shown in FIG. 5, in accordance with an example embodiment.

FIG. 6 is an illustration of a side view of the vertical lower post 4 shown in FIG. 5, in accordance with an example embodiment. FIG. 6 shows in better detail the location of the notches 4b/4b' and apertures 4a/4a' that may be included on the post 4.

Figure 7:
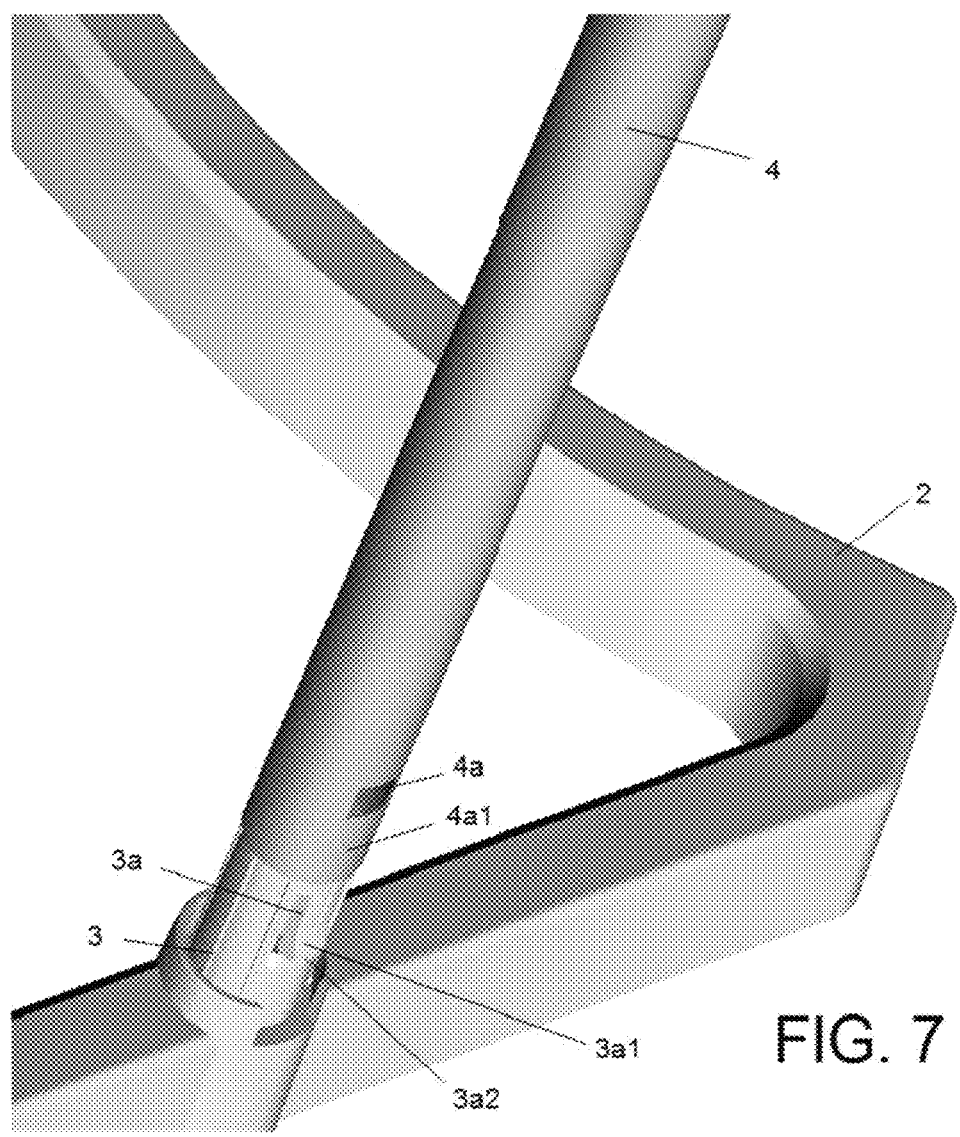
FIG. 7 is an illustration of a vertical lower post being installed on a base of a stand, in accordance with an example embodiment.

FIG. 7 is an illustration of a vertical lower post 4 being installed on a base 2 of a stand 10, in accordance with an example embodiment. In particular, FIG. 7 shows an alignment of the depressible stop 3a (on stub 3) with lower aperture 4a of the lower post 4. The depressible stop 3a may include an angled portion 3a1 that may allow an end 4a1 of the lower post 4 to slide over the depressible stop 3a, such that the end portion 4a1 of the post 4 may force the depressible stop 3a to be pressed inwards within the post 4. Once the lower post is fully pressed down onto stub 3, the depressible stop 3a may flare outward, so that the stop 3a may fill the aperture 4a. A lower edge 3a2 of the stop 2a may retard the lower post from being inadvertently separated from base 2. However, an end user may press the depressible stop 3a in order to allow the stop 3a to clear the lower portion 4a1 of the lower post 4 in order to intentionally remove the lower post 4 from the base 2 (during disassembly of the stand 10, for instance).

Figure 8:
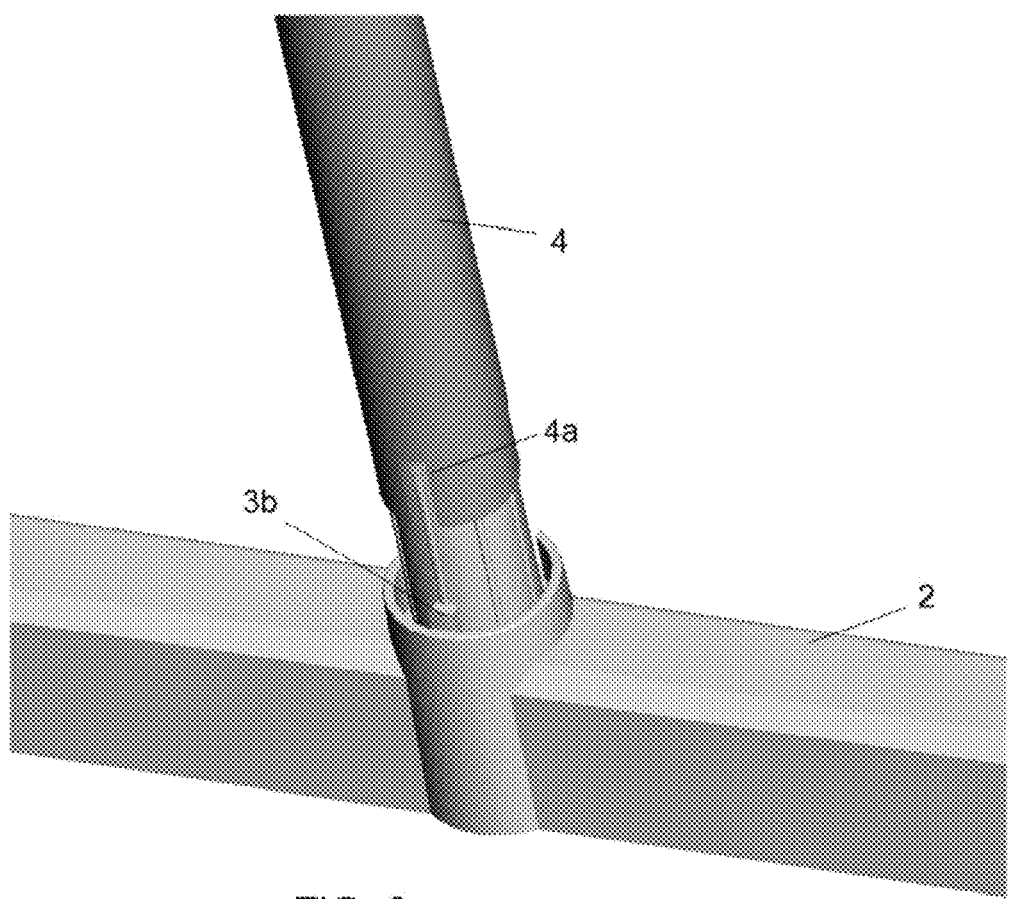
FIG. 8 is another illustration of another perspective of the vertical lower post being installed on the base of the stand shown in FIG. 7, in accordance with an example embodiment.

FIG. 8 is another illustration of another perspective of the vertical lower post 4 being installed on the base 2 of the stand 10 shown in FIG. 7, in accordance with an example embodiment. In particular, FIG. 8 shows an alignment between lower notch 4a and physical stop 3b as the lower post 4 is fitted onto base 2. The mating of the physical stop 3b with notch 4a, and the mating of depressible stop 3a with aperture 4a, may act as a two-point contact that allows post 4 to resist rotation while post 4 is fitted onto base 2. In an alternative embodiment, the post 4 may include only an aperture 4a that is mateable with depressible stop 3a (devoid of notch 4a and physical stop 3b). Likewise, more apertures or more notches may alternatively be included on an end of post 4, which may be mateable with respective physical stops or depressible stops.

Figure 9:
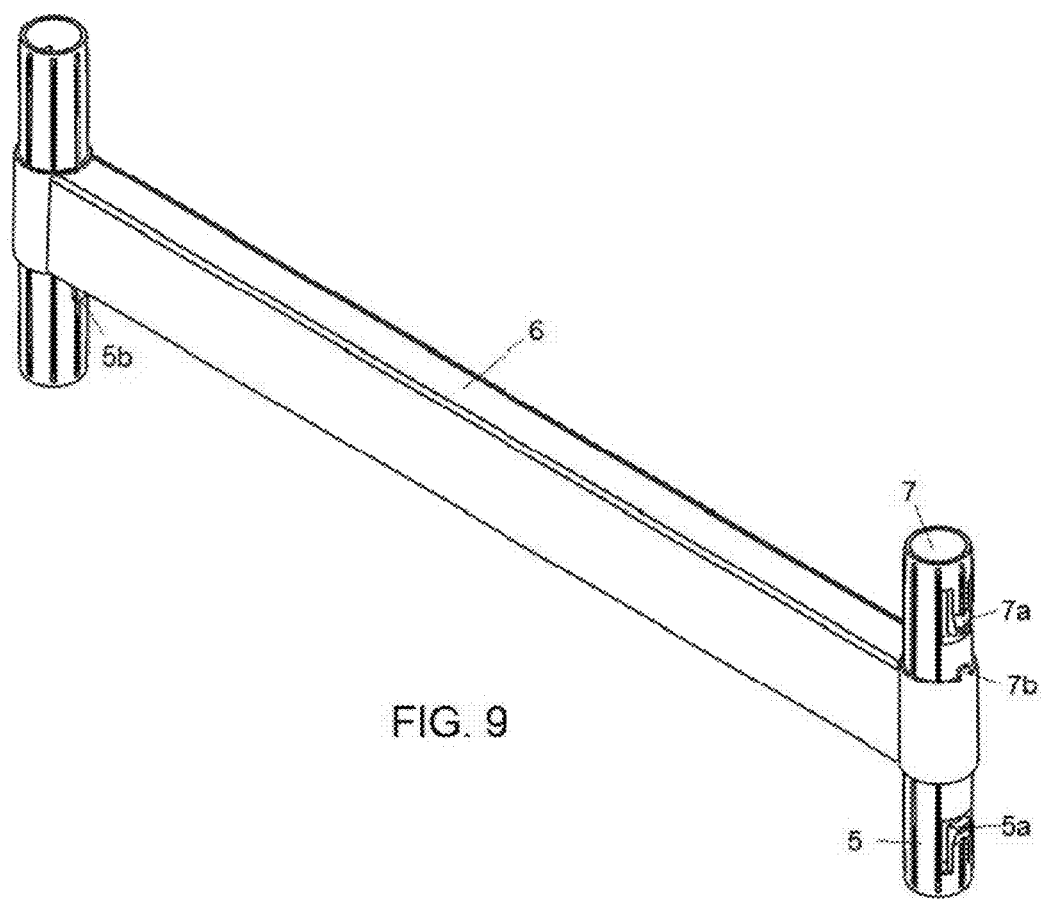
FIG. 9 is an illustration of a perspective view of a support bar of a stand, in accordance with an example embodiment.

FIG. 9 is an illustration of a perspective view of a support bar 6 of a stand, in accordance with an example embodiment. The support bar 6 may include vertical lower stubs 5 and vertical upper stubs 7. The lower stubs 5 may each include a lower physical stop 5b and a lower depressible stop 5a on an outer surface of the stubs 5. Similar to the stubs 3 of base 2, the position of the lower physical stops 5b and lower depressible stops 5a may vary (although the lower physical stops 5b and lower depressible stops 5a are shown to be 180 degrees apart from each other, on an outer surface of stubs 5, in the example embodiment of FIG. 9).

Figure 10:
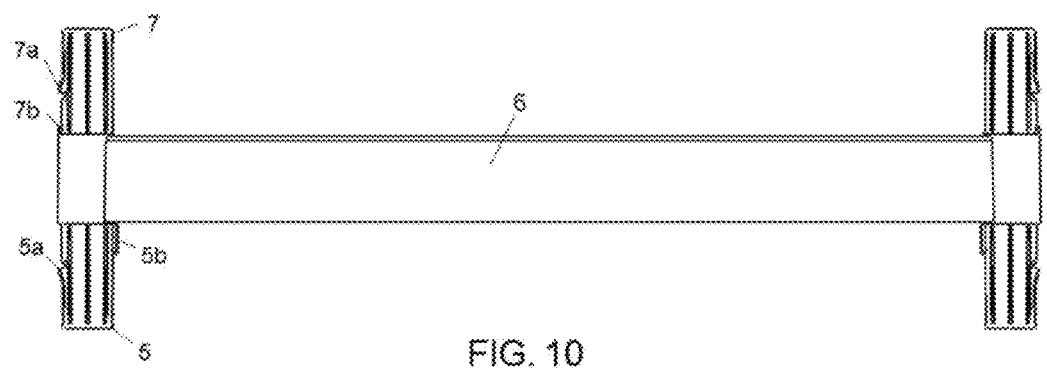
FIG. 10 is an illustration of a side view of the support bar shown in FIG. 9, in accordance with an example embodiment.

FIG. 10 is an illustration of a side view of the support bar 6 shown in FIG. 9, in accordance with an example embodiment. In particular, FIG. 10 shows in better detail, the positions of the lower depressible stop 5a, the lower physical stop 5b, the upper depressible stop 7a, and the upper physical stop 7b. As indicated above, the precise positions of the depressible stops and physical stops may change. Additionally, as indicated above, only depressible stops may be used, such that the physical stops may be excluded. Alternatively, more depressible stops, or more physical stops, may also be used. However, it should be understood that, by using a pairing of a physical stop with a depressible stop for each stub 5/7, the respective posts 4/8 will be less prone to twisting, as the two points of contact will add a degree of stability and vibration resistance that may assist the overall performance of the stand 10.

Figure 11:
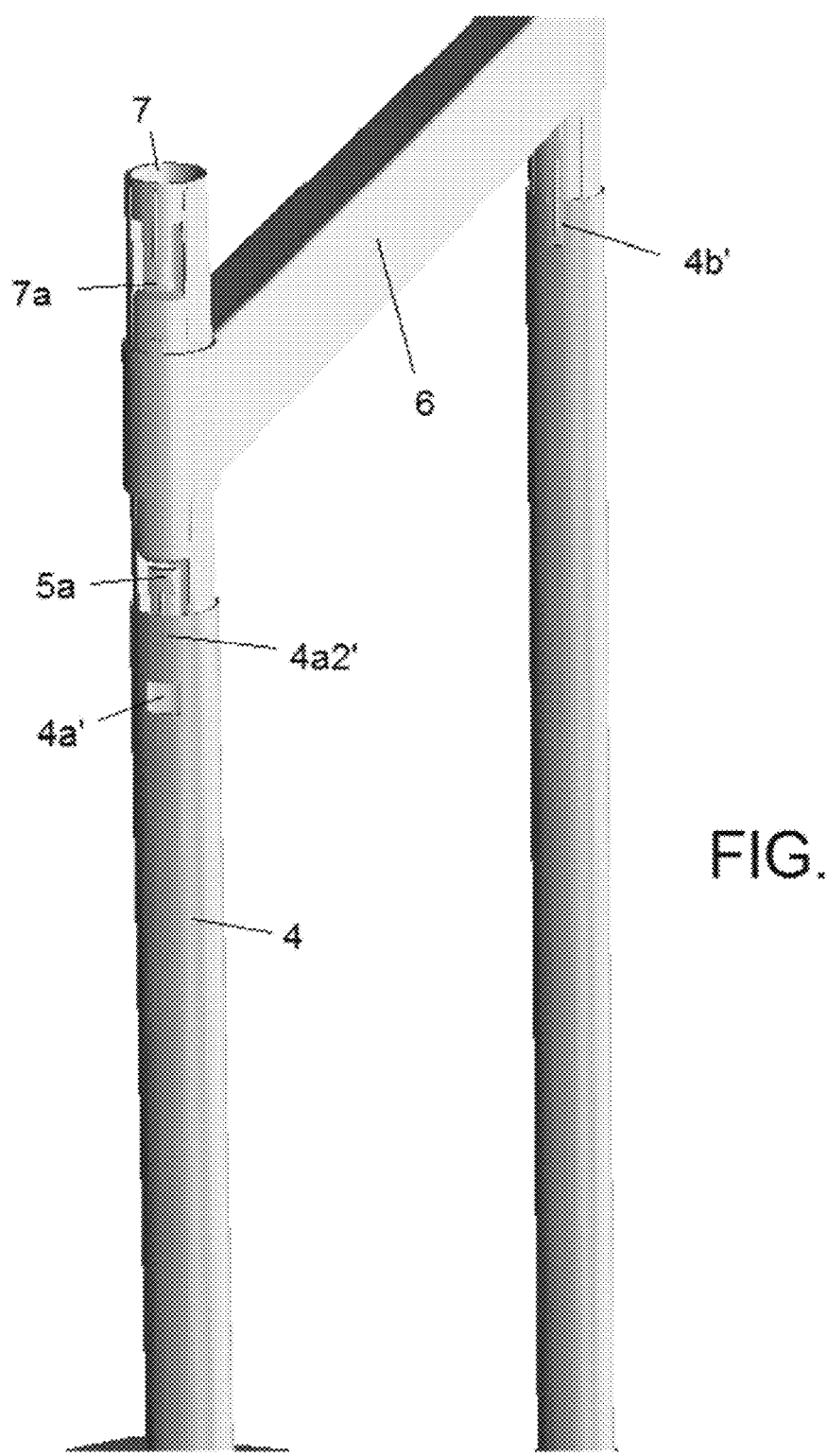
FIG. 11 is an illustration of the support bar shown in FIG. 9 being installed on a vertical lower post, in accordance with an example embodiment.

FIG. 11 is an illustration of the support bar 6 shown in FIG. 9 being installed on a vertical lower post 4, in accordance with an example embodiment. In particular, lower depressible stop 5a may align with the upper aperture 4a' of post 4, just as upper notch 4b' may also align with lower physical stop 5b. As described with regard to FIG. 7 (above), the depressible stop 5a may allow an upper portion 4a2' to clear the stop 5a, and once the support bar 6 is firmly pressed onto the lower post 4, the stop 5a may projected through aperture 4a' to cause support bar 6 to be physically secured to post 4.

Figure 12:
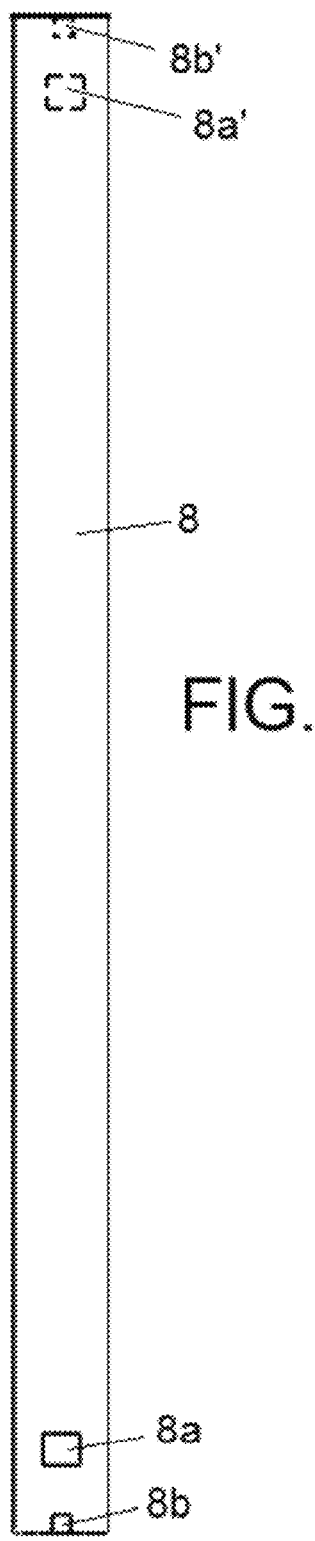
FIG. 12 is an illustration of a side view of a vertical upper post of a stand, in accordance with an example embodiment.

FIG. 12 is an illustration of a side view of a vertical upper post 8 of a stand 10, in accordance with an example embodiment. The upper post 8 may be similar to lower post 4, with the exception that lower apertures 8*a* and lower notch 8*b* may be on a same side of post 8, whereas the upper aperture 8*a*' and upper notch 8*b*' may also be on a same side of post 8, although the aperture 8*a*' and notch 8*b*' may be on an opposite side of the post 8 as compared to aperture 8*a* and notch 8*b*.

Figure 13:
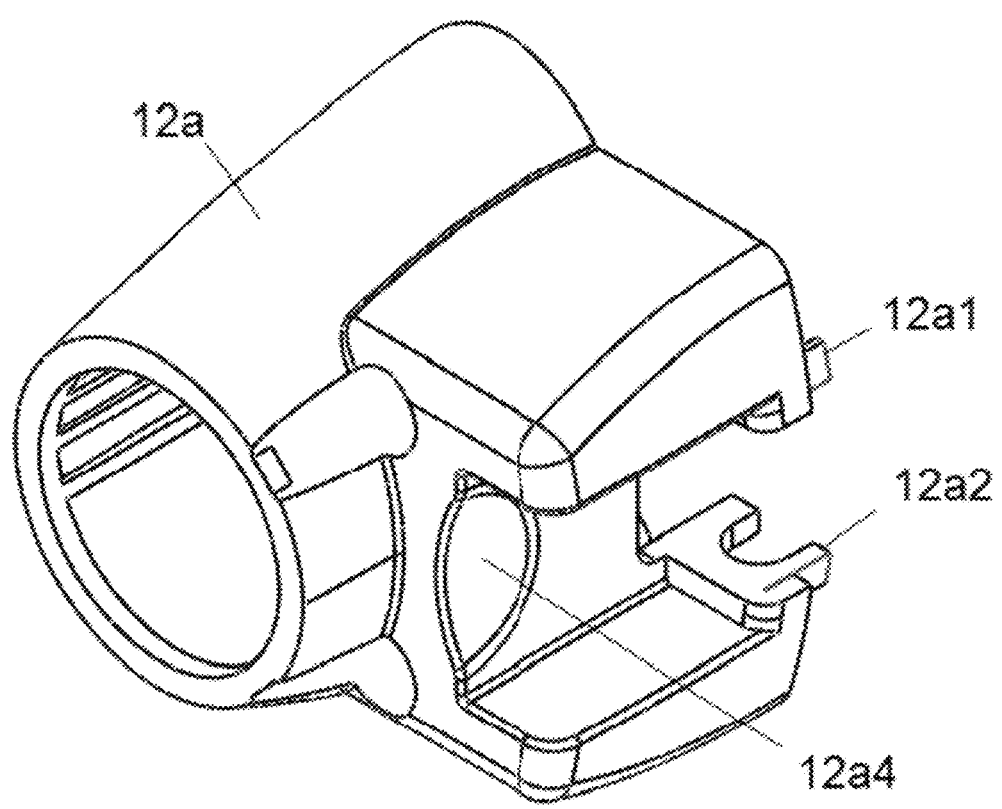
FIG. 13 is an illustration of a lower portion of a side clip of a stand, in accordance with an example embodiment.

FIG. 13 is an illustration of a lower portion 12*a* of a side clip 12 of a stand 10, in accordance with an example embodiment. The lower portion may include one more prongs 12*a*1/12*a*2 that may be mateable with holes 12*b*1/12*b*2 (or recesses) of an upper portion 12*b* of the side clip 12 (see the upper portion 12*b* in FIG. 14). The prongs 12*a*1/12*a*2 and holes 12*b*1/12*b*2 may be utilized to help the lower portion 12*a* and the upper portion 12*b* of the clip 12 stay connected together while in use. Other means of connecting the lower portion 12*a* and upper portion 12*b* of the clip together, such as clips, snap-fit components, frictional couplings, etc., may also be utilized.

A bolt hole 12*a*4 running clear-through the lower portion 12*a* may be provided in order to bolt the lower portion 12*a* directly to the fan.

Figure 14:
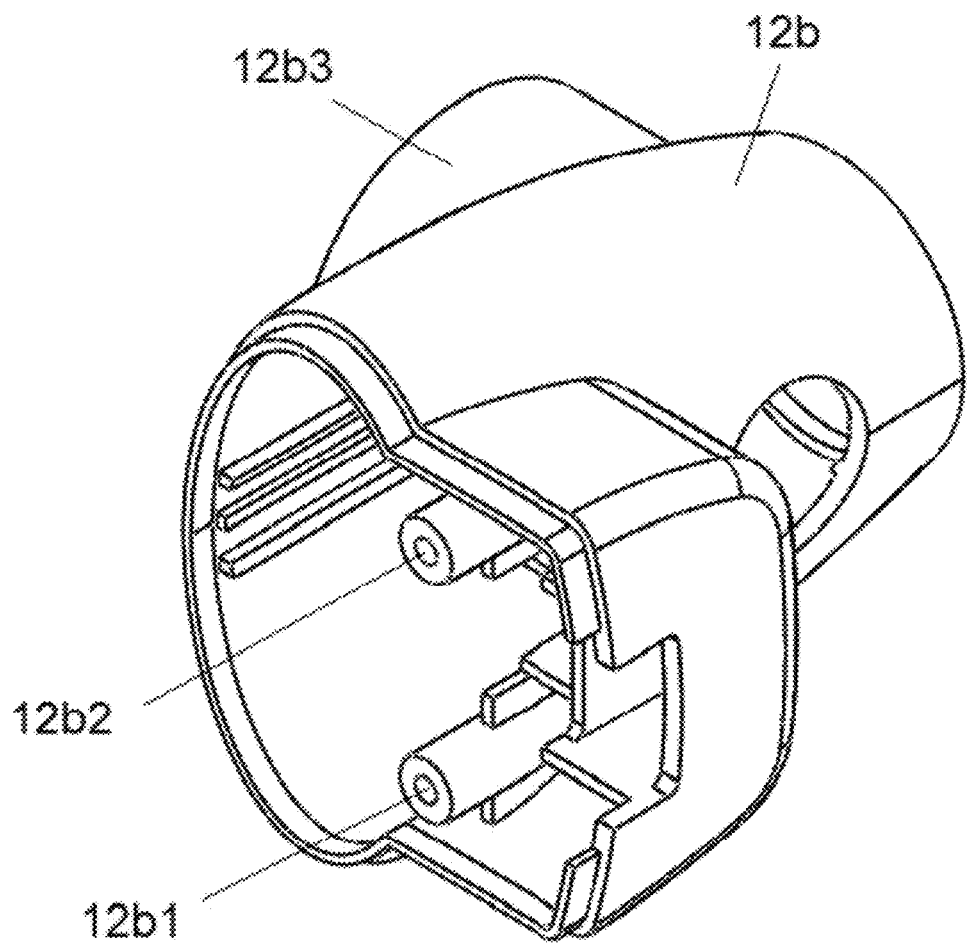
FIG. 14 is an illustration of an upper portion of a side clip of a stand, in accordance with an example embodiment.

FIG. 14 is an illustration of an upper portion 12*b* of a side clip 12 of a stand 10, in accordance with an example embodiment. The upper portion may include a socket 12*b*3, or other comparable structure, that may be used to connect the upper portion 12*b* of the clip 12 to the side surface of the fan 20. Therefore, the clip 12 may be connected to the fan 20 via two points of contact: 1) the socket 12*b*3 connecting upper portion 12*b* to the fan 20, and 2) a bolt running though bolt hole 12*a*4 connecting lower portion 12*a* to the fan 20.

Figure 15:
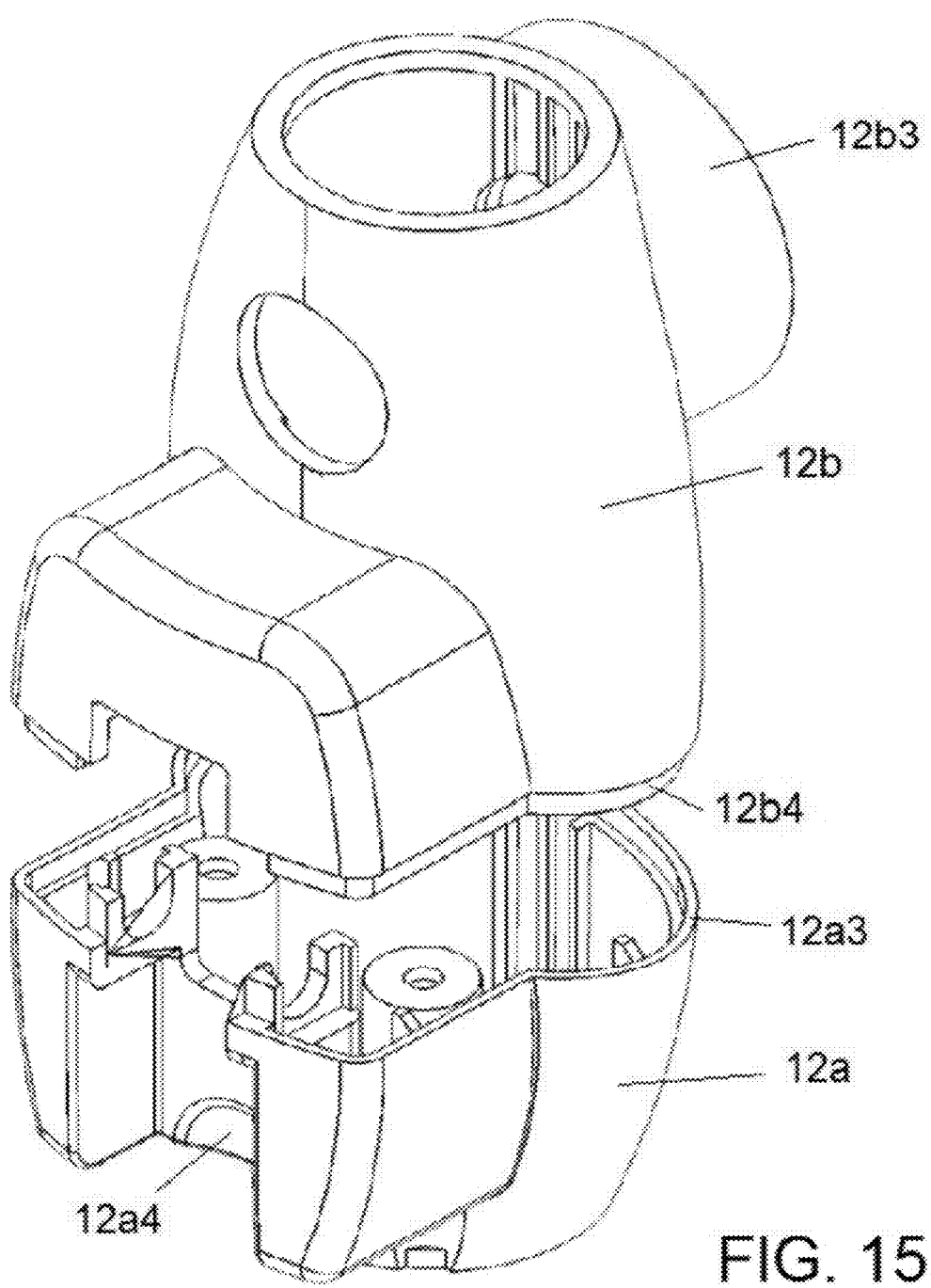
FIG. 15 is an illustration of a perspective view of the upper portion and lower portion of FIGS. 13 and 14 being connected together, in accordance with an example embodiment.

FIG. 15 is an illustration of a perspective view of the upper portion 12*b* and lower portion 12*a* of FIGS. 13 and 14 being connected together, in accordance with an example embodiment. A beveled edge 12*b*4 of the upper portion 12*b* may be provided in order to frictionally fit within an upper lip 12*a*3 of the lower portion 12*a* in order to further secure the portions 12*a*/12*b* to each other.

FIG. 16 illustrates a side view of the upper portion 12*b* and lower portion 12*a* of a FIGS. 13 and 14, in accordance with an example embodiment. In particular, FIG. 16 shows socket 12*b*3 of the upper portion 12*b* in better detail, where a socket hole 12*b*3*a* may be provided to engage a spindle (not shown) connected to the fan 20. The socket 12*b*3 may be configured to allow the fan 20 to pivot between opposing clips 12 (see FIG. 2) connected to the upper posts 8, so that the fan may be pivoted to face a more upward angle or a more downward angle based on an end user preference.

Figure 17:
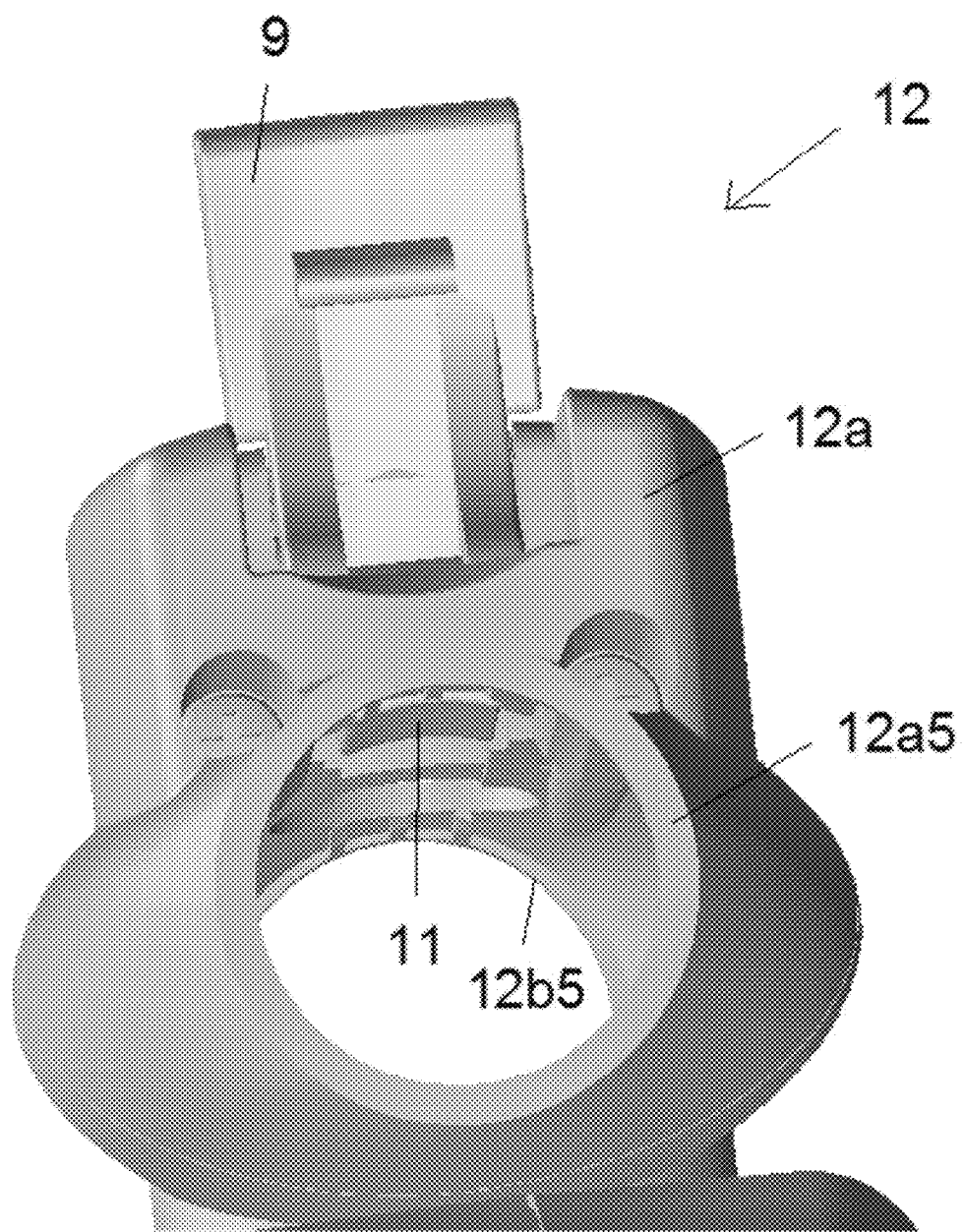
FIG. 17 is an illustration of a perspective view of an assembled side clip of a stand, in accordance with an example embodiment.

FIG. 17 is an illustration of a perspective view of an assembled side clip 12 of a stand 10, in accordance with an example embodiment. A hole 12*a*5 through the lower portion 12*a* of the clip 12, and a respective hole 12*b*5 through the upper portion 12*b* of the clip 12, may be included in order to allow the clip 12 to fit onto upper posts 8 (see at least FIG. 19). A hinged tab 9 may be included at a juncture between the lower portion 12*a* and the upper portion 12*b* of the clip 12. A gripper may also be positioned at an inner juncture between the lower portion 12*a* and the upper portion 12*b* of the clip 12. The hinged tab 9 and gripper 11 may be operably connected to each other, such that the gripper 11 may be forced slightly downward (i.e., toward a center-line of the holes 12*a*5/12*b*5) when the tab 9 is in a closed position (see FIG. 18), so that the gripper 11 may press and grip a side surface of the post 8 to lock clip 12 onto the post 8.

Figure 18:
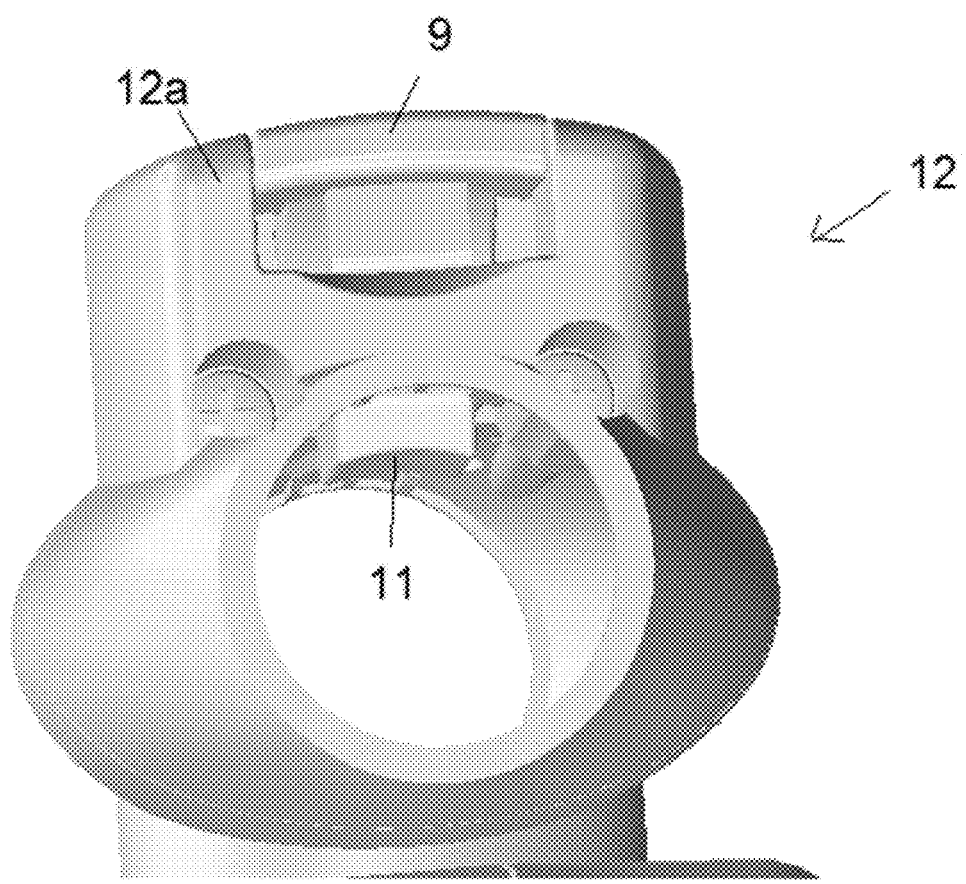
FIG. 18 is an illustration of another perspective view of the assembled side clip shown in FIG. 17, in accordance with an example embodiment.

FIG. 18 is an illustration of another perspective view of the assembled side clip 12 shown in FIG. 15, in accordance with an example embodiment. In FIG. 18, the hinged tab 9 is in the closed position. As described above, in the closed position, tab 9 may be configured to cause the gripper to be forced slightly downward in order to press again upper post 8 when the clip 12 is installed on the post 8.

Figure 19:
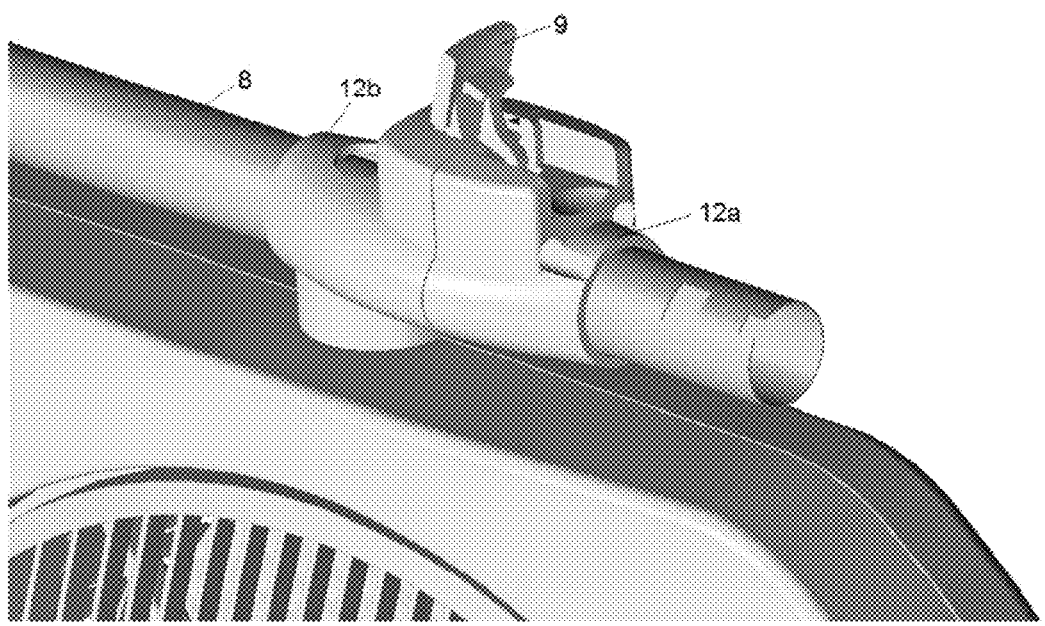
FIG. 19 is an illustration of a perspective view of the assembled side clip shown in FIG. 17, installed on a vertical upper post, in accordance with an example embodiment.

FIG. 19 is an illustration of a perspective view of the assembled side clip 12 shown in FIG. 15, installed on a vertical upper post 8, in accordance with an example embodiment. Specifically, FIG. 19 shows the hinged tab 9 in an opened position. In this position, the gripper (FIG. 18) is slightly retracted, allowing the clip 12 to slide along post 8. This may allow the fan 20 to be shifted upwards or downwards on the opposing posts 8 (FIG. 2) in order to adjust the height of the fan 20 relative to the ground.

Figure 20:
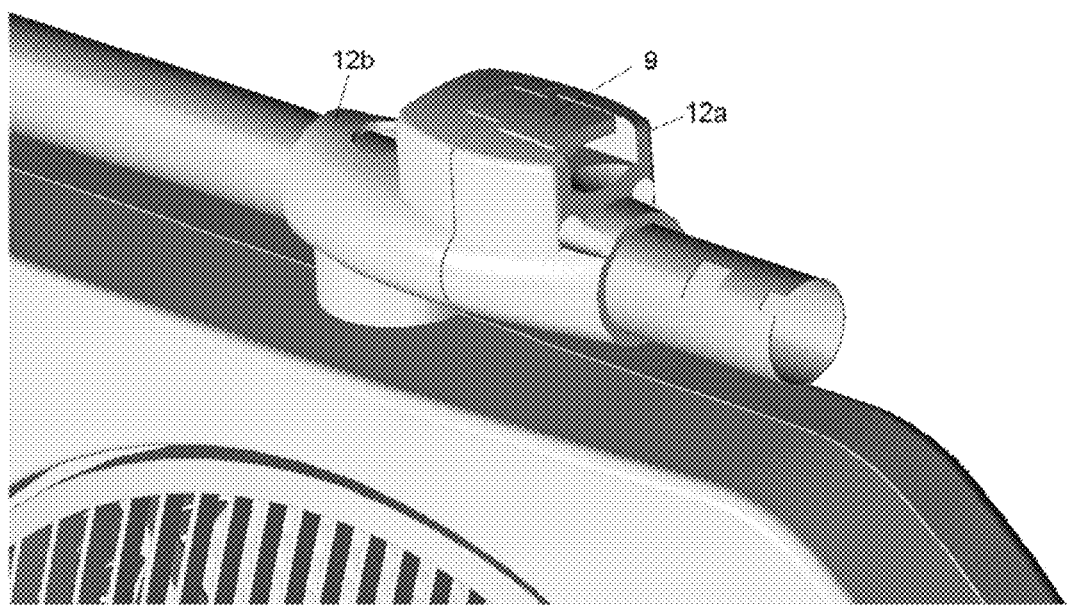
FIG. 20 is an illustration of another perspective view of the assembled side clip shown in FIG. 17, installed on the vertical upper post, in accordance with an example embodiment.

FIG. 20 is an illustration of another perspective view of the assembled side clip 12 shown in FIG. 17, installed on the vertical upper post 8, in accordance with an example embodiment. Specifically, FIG. 20 shows the hinged tab 9 in the closed position, such that gripper 11 may be pressed against post 8, thereby locking the clip 12 in a fixed position on post 8.

Figure 21:
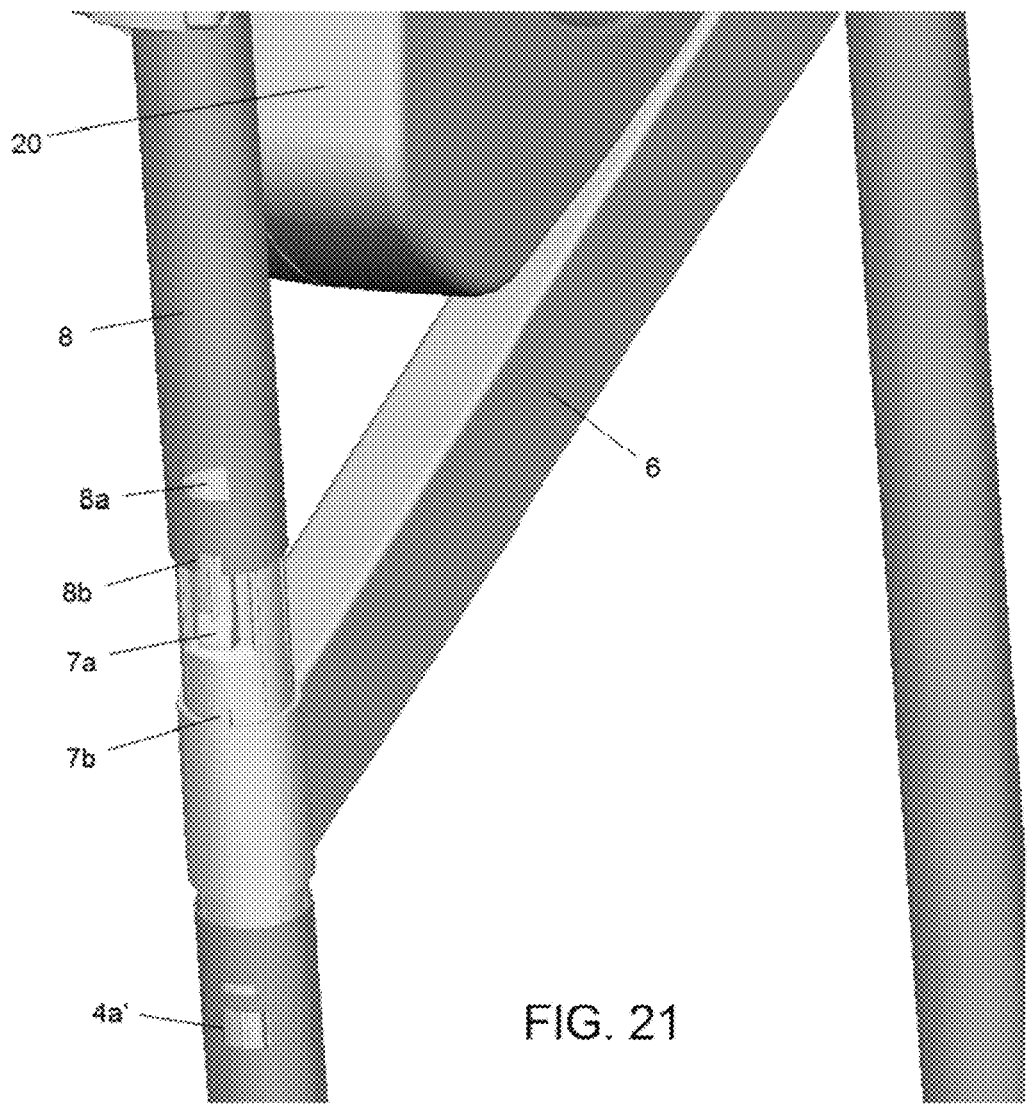
FIG. 21 is an illustration of a vertical upper post being installed on a support bar, in accordance with an example embodiment.

FIG. 21 is an illustration of a vertical upper post 8 being installed on a support bar 6, in accordance with an example embodiment. In particular, FIG. 21 shows aperture 8*a* and depressible stop 7*a* aligning with each other, and notch 8*b* and physical stop 7*b* aligning with each other.

FIG. 22 is an illustration of an exploded view of an unassembled stand 10, in accordance with an example embodiment. In particular, FIG. 22 shows the orientation of the pieces of the stand 10 that are described in detail in FIGS. 1-21, where the major pieces of the stand include: base 2 with stubs 3, lower posts 4, support bar 6 with lower and upper stubs 5/7, lower and upper portions 12*b*/12*a* of clip 12, upper posts 8 and stoppers 14. Because the upper and lower portions 12*b*/12*a* of clip 12 may require bolts to affix the clip 12 to the fan, the clips 12 may be attached to the fan 20 by a technician prior to a sale of the stand 10, such that the remaining assembly of the stand 10 may be accomplished manually by an end user without the use of any tools.

Figure 23:
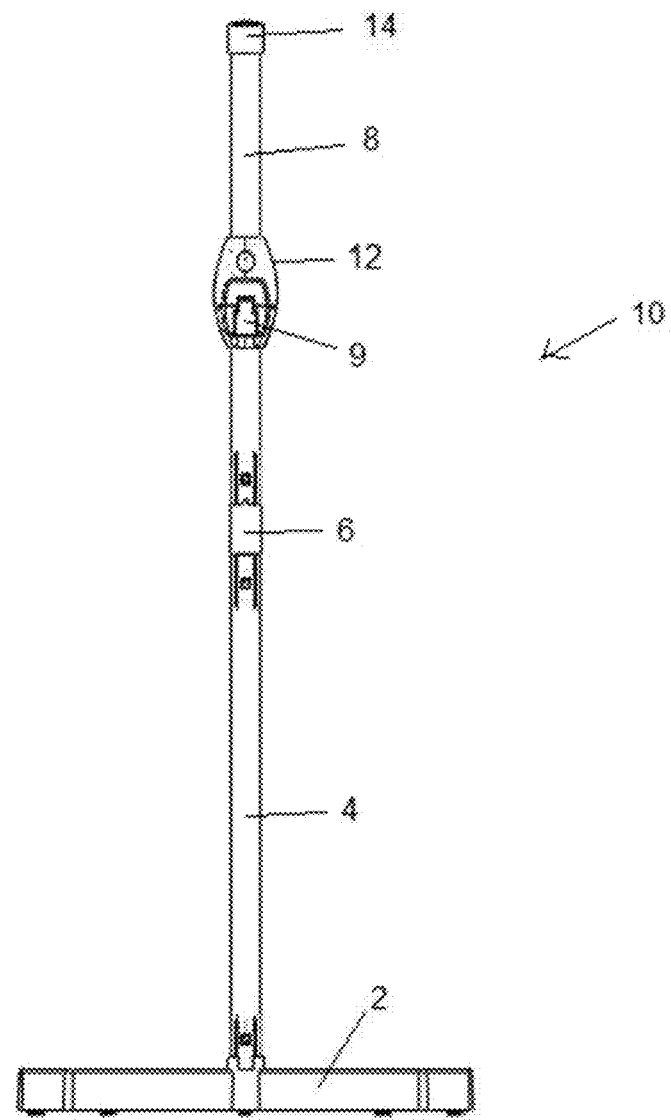
FIG. 23 is an illustration of a side view of an assembled stand, in accordance with an example embodiment.

FIG. 23 is an illustration of a side view of an assembled stand 10, in accordance with an example embodiment. The stand 10 of FIG. 23 shows many of the components of FIGS. 1-22 in an assembled state, and because these components have already been described, they are therefore not described again here, for brevity sake.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A kit for a stand holding an electronic device, comprising:
   at least a first and a second lower vertical post;
   a horizontal support bar with at least a first and a second lower vertical stub and at least a first and second upper vertical stub, a first end of each of the lower vertical posts being connectable to the respective first and second lower vertical stubs via at least two points of contact;
   at least a first and a second upper vertical post, a first end of each of the upper vertical posts being connectable to the respective first and second upper vertical stubs via at least two points of contact;
   a first and a second side clip, each of the side clips being connected to the electronic device, the side clips being configured to slide onto the respective first and second upper vertical posts, the side clips being configured to selectively grip the respective first and second upper vertical posts at positions along a longitudinal length of the respective first and second upper vertical posts;

a base with at least a first and a second bottom vertical stub, a second end of each of the lower vertical posts being connectable to the respective first and second bottom vertical stubs of the base via at least two points of contact; and a connecting structure configured to allow the stand to be assembled without requiring tools, the connecting structure including,
  a lower aperture and a lower notch defined by the first end of each of the lower vertical posts,
  a lower depressible stop and a lower physical stop on each of the lower vertical stubs of the horizontal support bar, the lower aperture and the lower notch being respectively mateable with the lower depressible stop and the lower physical stop to provide the two points of contact for the connection between the lower vertical stubs of the horizontal support bar and the lower vertical posts.

2. The kit of claim 1, wherein the connecting structure further includes,
  a bottom aperture and a bottom notch defined by the second end of each of the lower vertical posts,
  a bottom depressible stop and a bottom physical stop on each of the bottom vertical stubs of the base, the bottom aperture and the bottom notch being respectively mateable with the bottom depressible stop and the bottom physical stop to provide the two points of contact for the connection between the lower vertical posts and the bottom vertical stubs of the base.

3. The kit of claim 2, wherein the connecting structure further includes,
  an upper aperture and an upper notch defined by the first end of each of the upper vertical posts, the upper aperture and upper notch being respectively mateable with an upper depressible stop and an upper physical stop on each of the upper vertical stubs of the horizontal support bar to provide the two points of contact for the connection between the upper vertical posts and the upper vertical stubs of the horizontal support bar.

4. The kit of claim 3, wherein the lower and bottom apertures are on a same first side of the lower vertical posts, and the lower and bottom notches are on a same second side of the lower vertical posts, wherein the apertures and notches of the lower vertical posts are respectively offset from each other by about 180 degrees along a circumference of each of the respective lower vertical posts.

5. The kit of claim 3, wherein the bottom vertical stubs of the base are on opposing sides of the base, and the bottom depressible stops of the bottom vertical stubs are facing away from each other on opposing sides of the bottom vertical stubs, wherein the bottom physical stops of the bottom vertical stubs face each other on the bottom vertical stubs.

6. The kit of claim 3, wherein the upper and lower depressible stops and the upper physical stops of the respective upper and lower vertical stubs of the horizontal support bar are on a same first side of each of the respective upper and lower vertical stubs, wherein the lower physical stops are on opposing sides of the respective lower vertical stubs relative to a location of the lower depressible stops, the lower physical stops facing each other on the horizontal support bar.

7. The kit of claim 6, wherein the lower physical stops of the lower vertical stubs of the horizontal support bar are about 180 degrees offset from the lower depressible stops along a circumference of the lower vertical stubs.

8. The kit of claim 1, wherein the electronic device is a fan, each of the side clips including a hinged tab facing away from the fan, the hinged tabs of each of the side clips communicating with a gripper positioned along an inner surface of each of the respective side clips, each of the grippers being configured to selectively grip the respective first and second upper vertical posts via selective movement of the hinged tabs.

9. The kit of claim 1, wherein the lower vertical posts are longer than the upper vertical posts.

10. A kit for a stand holding a fan, comprising:
  at least a first and a second lower vertical post;
  a horizontal support bar with at least a first and a second lower vertical stub and at least a first and second upper vertical stub, a first end of each of the lower vertical posts being connectable to the respective first and second lower vertical stubs via at least two points of contact;
  at least a first and a second upper vertical post, a first end of each of the upper vertical posts being connectable to the respective first and second upper vertical stubs via at least two points of contact;
  a first and a second side clip, each of the side clips being connected to the fan, the side clips being configured to slide onto the respective first and second upper vertical posts, the side clips being configured to selectively grip the respective first and second upper vertical posts at positions along a longitudinal length of the respective first and second upper vertical posts, each of the side clips being connected to sides of the fan with a socket to allow a front of the fan to pivot in upward and downward angles;
  a base with at least a first and a second bottom vertical stub, a second end of each of the lower vertical posts being connectable to the respective first and second bottom vertical stubs of the base via at least two points of contact; and
  a connecting structure configured to allow the stand to be assembled without requiring tools, the connecting structure including press-fit connections that provide each of the respective two points of contact.

11. A stand that is capable of being assembled by a method that does not require tools, the method utilizing the kit of claim 3, the method comprising:
  depressing the bottom depressible stops of the bottom vertical stubs of the base and sliding the second ends of the first and second lower vertical posts onto the respective bottom vertical stubs so that the bottom physical stops mate with the bottom notches and the bottom depressible stops slide into the bottom apertures;
  depressing the lower depressible stops of the lower vertical stubs of the horizontal support bar and sliding the first ends of the first and second lower vertical posts onto the respective lower vertical stubs so that the lower physical stops mate with the upper notches and the lower depressible stops slide into the upper apertures; and
  depressing the upper depressible stops of the upper vertical stubs of the horizontal support bar and sliding the ends of the first and second upper vertical posts onto the respective upper vertical posts so that the upper physical stops mate with the lower notches and the upper depressible stops slide into the lower apertures.

12. The method of claim 11, further comprising:
sliding the first and second side clips onto the respective first and second upper vertical posts;
locking the electronic device into a desired vertical elevation along the first and second upper vertical posts using the side clips; and
pressing stoppers on top of upper ends of the upper vertical posts.

13. A stand, comprising:
a horizontal support bar;
at least a first and second lower vertical post, a first end of each of the lower vertical posts being connected to lower vertical stubs on a lower portion of the horizontal support bar via at least two points of contact;
at least a first and second upper vertical post, a first end of each of the upper vertical posts being connected to upper vertical stubs on an upper portion of the horizontal support bar via at least two points of contact;
a first and a second side clip, each of the side clips being connected to a fan to hold the fan between the upper vertical posts, each of the side clips being configured to selectively grip one of the first and second upper vertical posts at positions along a longitudinal length of the respective upper vertical posts, the side clips including a hinged tab facing away from the fan and being in communication with a gripper positioned along and inner surface of each of the side clips, the gripper being configured to selectively grip the respective first and second upper vertical posts; and
a connecting structure configured to allow the stand to be assembled without requiring tools, the connecting structure including press-fit connections that provide each of the respective two points of contact.

14. The stand of claim 13, further comprising:
a base, wherein a second end of each of the lower vertical posts being connected to bottom vertical stubs on the base via at least two points of contact.

15. The stand of claim 14, wherein the connecting structure includes,
at least two of a physical stop and a depressible stop on each of the vertical stubs, and
at least two of a notch and an aperture defined by each of the first and second ends of the lower vertical posts and each of the first ends of the upper vertical posts, the notches and apertures of the lower vertical posts being mateable with the respective physical stops and depressible stops of the vertical stubs to provide the two points of contact.

16. The stand of claim 15, wherein the connecting structure further includes,
a physical stop and a depressible stop on each of the vertical stubs,
an upper depressible stop and an upper physical stop on a same side of the upper vertical stubs.

17. The stand of claim 16, wherein the connecting structure includes,
a lower depressible stop and a lower physical stop on opposing sides of each of the respective lower vertical stubs and the bottom vertical stubs, and
the respective lower and bottom physical stops of the lower and bottom vertical stubs face inward toward each other.

18. The stand of claim 13, each of the side clips is connected to sides of the fan via a socket that allows a front of the fan to pivot in upward and downward angles.

\* \* \* \* \*